United States Patent [19]

James et al.

[11] 4,021,615
[45] May 3, 1977

[54] APPARATUS FOR CONSERVING ENERGY IN A BUILDING

[75] Inventors: Emrys Craig James, Palm Beach Gardens; Gerald Henry Fairfax, North Palm Beach, both of Fla.

[73] Assignee: RCA Corporation, New York, N.Y.

[22] Filed: July 30, 1975

[21] Appl. No.: 600,509

[52] U.S. Cl. .......................... 179/2 A; 340/147 R
[51] Int. Cl.² .................................. H04M 11/00
[58] Field of Search ............ 179/2 A, 2 R, 84 VF, 179/2 AM, 5 R, 2 DP, 175.3 R; 340/286, 147 R; 325/492

[56] References Cited

UNITED STATES PATENTS

| | | | |
|---|---|---|---|
| 2,516,361 | 7/1960 | Barker | 179/2 A |
| 3,308,239 | 3/1967 | Waldman | 179/2 A |
| 3,553,376 | 1/1971 | Bogaart | 179/2 A |
| 3,588,357 | 6/1971 | Sellari | 179/2 A |
| 3,842,218 | 10/1974 | DeLuca | 179/2 A |
| 3,859,462 | 1/1975 | Saxon | 179/2 A |
| 3,912,882 | 10/1975 | Beerbaum | 179/2 A |

*Primary Examiner*—Kathleen Claffy
*Assistant Examiner*—Joseph A. Popek
*Attorney, Agent, or Firm*—Carl V. Olson; H. Christoffersen; Samuel Cohen

[57] ABSTRACT

Apparatus for turning off power-consuming appliances in rooms of a building having a private automatic branch exchange telephone system includes computer-controlled means at the exchange central periodically to apply short bursts of audio-frequency oscillations to telephone lines going to rooms in which power can be conserved. Detecting means in each room connected to the room telephone line provide an output on receipt of a burst which operates a line relay in the room, disconnecting power from the appliance in the room, for a predetermined time period greater than the time period between the periodic application of bursts at the exchange central.

4 Claims, 3 Drawing Figures

APPARATUS FOR CONSERVING ENERGY IN A BUILDING

BACKGROUND OF THE INVENTION

The worsening energy shortage has increased the need to decrease the amount of energy which is wasted. Much energy can be conserved by limiting the air conditioning and heating of unoccupied rooms in hotels, motels, and other buildings. The saving can be maximized if room air conditioners and heaters are turned on shortly before a room is occupied and are turned off promptly after a room is vacated. This is best accomplished from a centralized control point in a building where information on the status of each room is maintained, such as at the front desk of a hotel or motel. Energy conservation can be accomplished with relatively little additional expense if the building is already provided with a computer-controlled system for recording and displaying the status of each room, and the charges accumulated by the occupants of the respective rooms.

SUMMARY OF THE INVENTION

A short burst of audio frequency oscillations of predetermined frequency and duration periodically is applied at a central location in a building to a telephone line going to a room known to be unoccupied. Each burst is detected in the room and is used to discontinue the use of energy in the room for a period of time greater than the time interval between periodically supplied bursts.

DESCRIPTION OF THE PREFERRED EMBODIMENT

Figure 1:
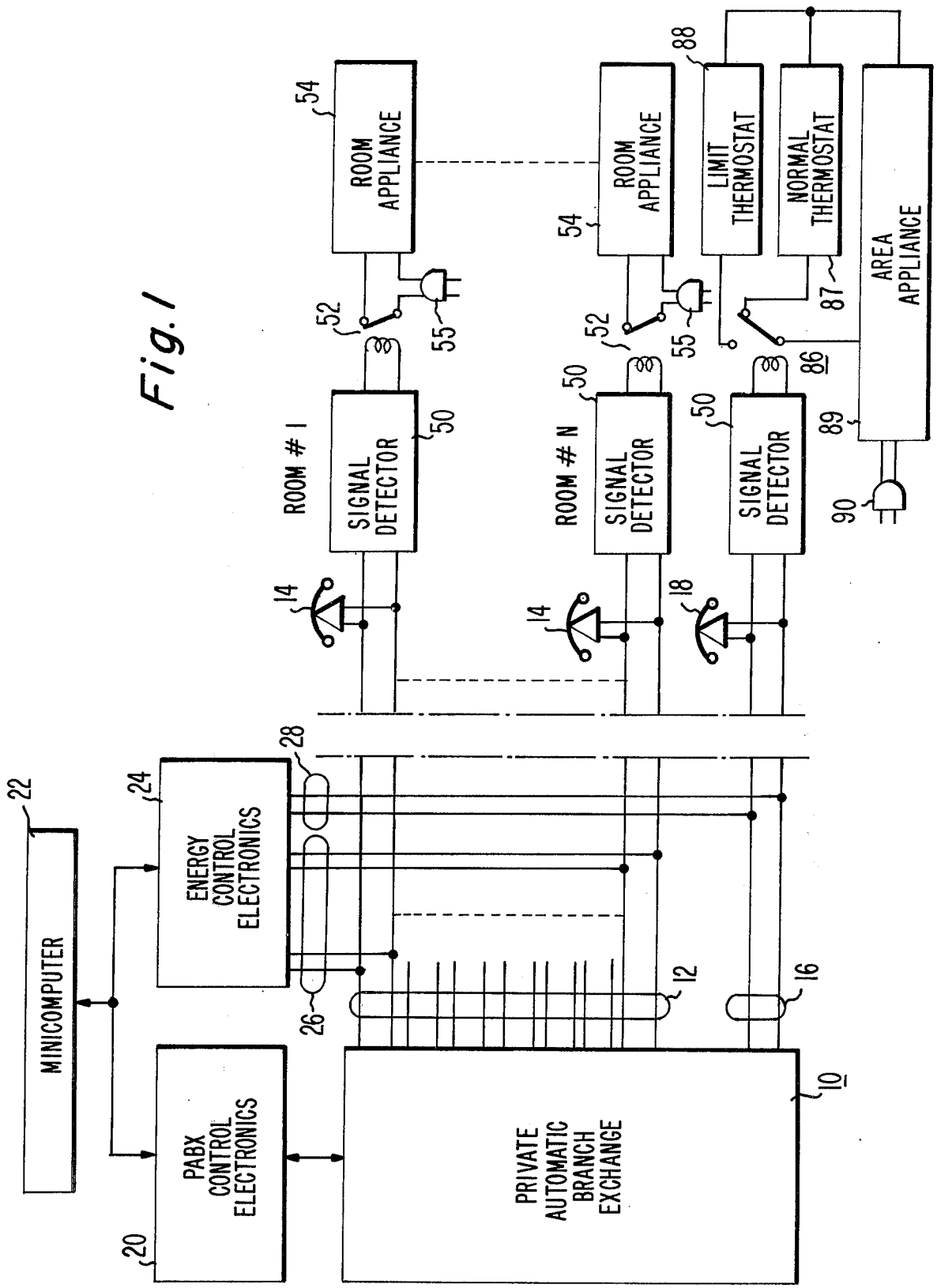
FIG. 1 is a diagram of a system according to the invention by which room appliances in a building are selectively turned off from a central point.

FIG. 1 shows an entire system including a private automatic branch exchange 10 located at a central place in a hotel, motel or other multi-room building. Telephone lines 12 go from the exchange 10 to telephones 14 in corresponding individual rooms membered 1 through N. An additional telephone line 16 goes to a telephone 18 in a commercial or common area in the building. The exchange 10 is controlled through a PABX control electronics 20 by a general-purpose minicomputer 22 which is suitably programmed for the purpose. The thus-far described part of the system is known, is not a part of the present invention, and need not be described in greater detail.

Figure 2:
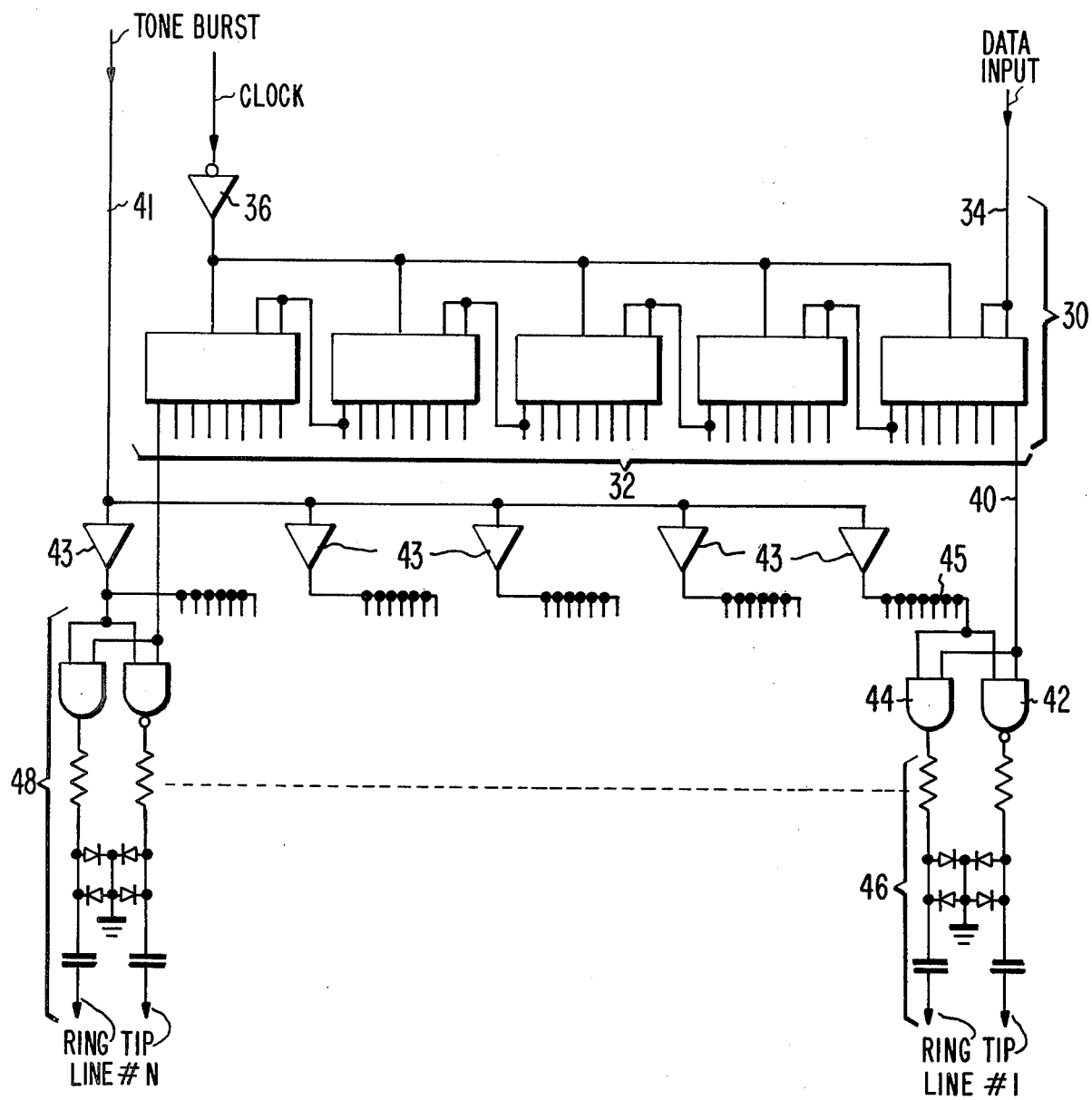
FIG. 2 is a diagram of electronic apparatus at the central point for applying signals to telephone lines going to the rooms.

An energy control electronics unit 24 is centrally located with the exchange 10 and has output lines 26 connected to respective telephone lines 12, and an output line 28 connected to telephone line 16. The energy control electronics unit 24 is also controlled by the minicomputer 22. FIG. 2 shows part of the contents of the energy control electronics 24 including a shift register 30 having as many stages as there are telephone lines 12 and 16 and rooms in the building. The shift register is shown, by way of example, to consist of five serially-interconnected integrated circuit units each having eight stages, to provide 40 stages and 40 output lines 32. Each integrated circuit may be a type SN74164 shift register manufactured by Texas Instrument. The shift register is serially loaded with binary information from the minicomputer 22 over line 34 under the control of a stepping clock pulse wave over path 36 also from the minicomputer. A 1 bit in a particular stage of the shift register means that energy should be conserved in the corresponding room, and a 0 bit means that the room is occupied and the heater or air conditioner should not be turned off.

The binary information loaded into the shift register 30 is available in parallel at the outputs of the shift register. The output at 40 from stage number 1 of the shift register 30 is connected to an input of an inverting "and" gate 42 and to an input of non-inverting "and" gate 44. The gates are also receptive over line 41, amplifiers 43 and lines 45 to an audio-frequency tone burst of predetermined frequency and duration, such as 4000 Hz for 50 milliseconds, from an oscillator (not shown) in the energy control electronics 24, under control of the minicomputer 22. The resulting balanced push-pull audio-frequency burst at the outputs of gates 42, 44 is coupled by circuit 46 to the "ring" and "tip" conductors of the telephone line going from the exchange 10 to the number 1 room. FIG. 2 also shows the corresponding circuits at 48 for telephone line and room number N, where N equals forty in the example. The circuits for lines number two through thirty-nine are omitted from the drawing.

Figure 3:
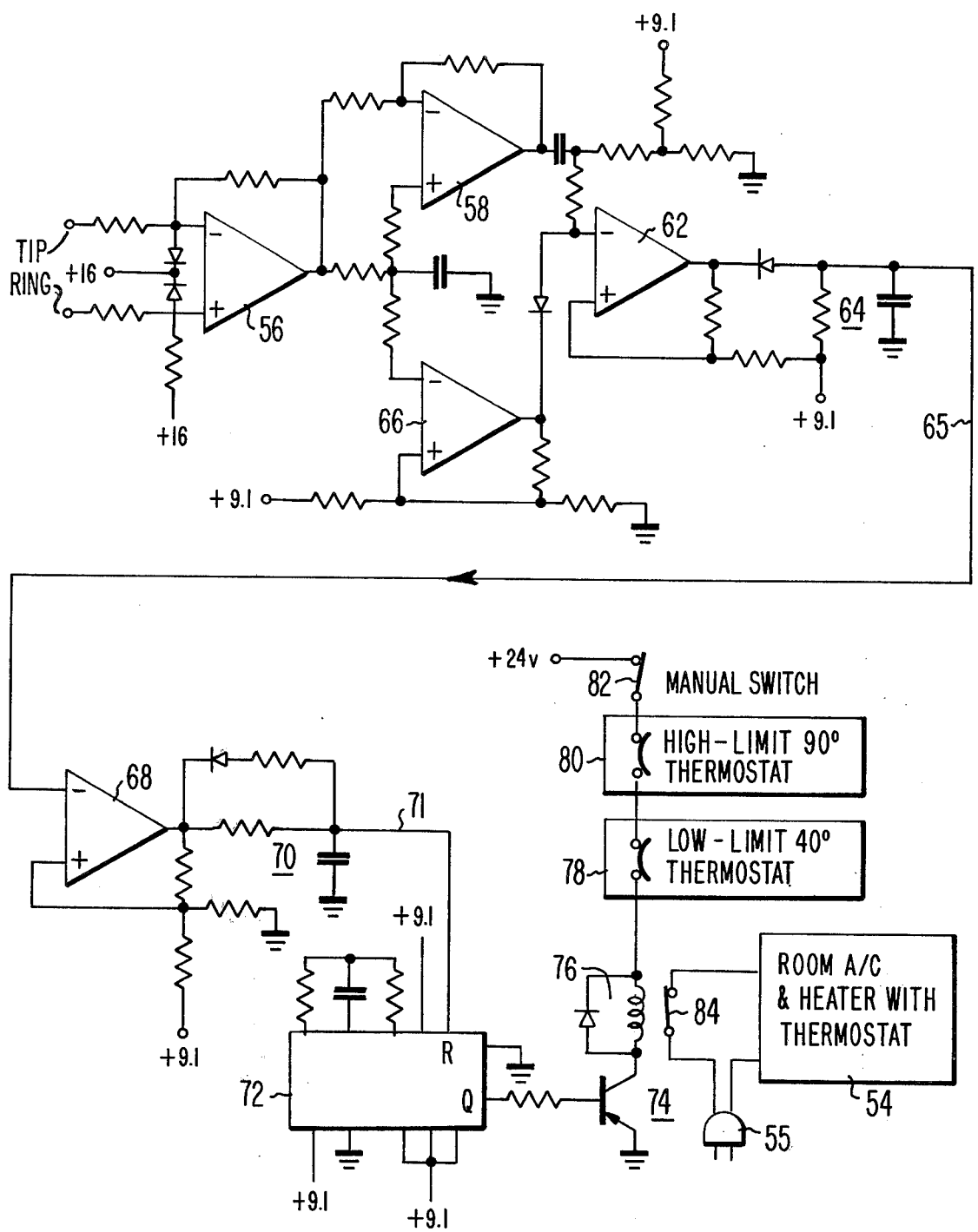
FIG. 3 is a diagram of electronic and electrical apparatus located in each room of the building.

As shown in FIG. 1, each of the N rooms includes a telephone 14, a signal detector 50 connected to the telephone line, a line relay 52, and a room appliance 54 which may be an air conditioner, or a heater, for example. FIG. 3 shows these elements in greater detail. The signal detector 50 includes operational amplifier 56 connected as an impedance buffer having tip and ring inputs terminals for connection to corresponding conductors of the room telephone line. The output of the buffer amplifier is applied through an operational amplifier 58 connected as a linear amplifier and an operational amplifier 62 connected as a limiting-squaring amplifier.

An operational amplifier 66 is connected in the signal detector circuit to disable the detector from providing an output when the receiver of telephone 14 is off the hook. This function is provided to prevent a false operation of the energy conservation system by voice frequencies resulting from telephone conservations of telephone users. The function is accomplished by the circuit of operational amplifier 66 which responds to a change in the differential voltage between the tip and ring conductors and causes a signal-inhibiting condition at the input of amplifier 62.

When a tone burst is received, the output of operational amplifier 62 is a burst of square wave cycles at the audio frequency of the tone burst. Each square wave cycle charges and quickly discharges a capacitor in an R-C circuit 64. If the tone burst has an uninterrupted frequency of 4000 Hz or greater, the capacitor is periodically discharged before the voltage thereacross can build up to a value as high as a threshold value of 4.5 volts, for example.

The signal at the R-C circuit 64 is applied over line 65 to the "minus" input of an operational amplifier 68 biased to respond with a high output to input signals having a voltage below a 4.5 volt threshold determined by the bias connected to the + input. The operational amplifier 68 therefore responds only when the input signal is a tone burst of 4000 Hz or more. The output of operational amplifier 68 is connected to an R-C circuit 70 including a capacitor which charges exponentially during receipt of a tone burst. The R-C circuit 70 is proportioned to provide an output signal on line 71 which exceeds a predetermined value needed to operate a following circuit 72 after a received tone burst has persisted for a time period of, say, 45 milliseconds. If the received tone burst has a duration of 50 milliseconds, the output on line 71 has a value above the threshold for 5 milliseconds which operates the following circuit 72. This occurs only when the input signal to the detector is a tone burst having the predetermined duration of about 50 milliseconds.

The 5-millisecond signal present at 71 is applied to the reset input R of the device 72 which is a time-out device consisting of an oscillator-counter which may be a type MC14541 oscillator-counter manufactured and sold by Motorola Semiconductor Company. The output terminal Q of the device 72 is coupled to the base electrode of a transistor 74 having its collector electrode connected through the operating coil 76 of a line relay, the contacts of a low-limit thermostat 78, the contacts of a high-limit thermostat 80, and the contacts of a manual switch 82 to the positive terminal of a source of bias potential. The transistor 74 is normally off, and the contacts 84 of the line relay are normally closed connecting the room air conditioner and heater 54 with the power line through plug 55.

When a signal burst of predetermined frequency and duration is detected, the oscillator-counter 72 renders the transistor 74 conductive. This causes the contacts 84 of the line relay to open disconnecting the appliance 54 from the power line. The oscillator-counter 72 maintains this condition for a predetermined time such as two minutes, which is longer than the time interval between successive bursts applied to the telephone line at the central location. At the expiration of the predetermined time, the output of the oscillator-counter 72 turns transistor 74 back off so that line relay contacts 84 can again close and apply power to the appliance 54. However, this occurs only if a second burst is not received before the end of the 2-minute time-out by the oscillator-counter.

The room air conditioner and heater 54 is provided with its own thermostat so that it is turned on only when cooling or heating is needed to maintain a desired room temperature. The separate low-limit thermostat 78 prevents the turning off of the heater via the line relay 76, 84 when the temperature is so low as to present a danger of freezing. Similarly, the high-limit thermostat so prevents the turning off of the air conditioner via line relay 76, 84 when the temperature is above a high value such as 90° F. The manual switch 82 permits a disabling of the energy conservation system in the respective room.

FIG. 1 shows an additional telephone line 16 extending from the central exchange 10 to a public room or area such as a dining room, a lobby, a conference room, a commercial area, or the like. The area has signal detector 50 as has been described but has a different relay with contacts normally connecting a normal thermostat 87 in circuit with the area appliance 89 when the relay 86 is energized by the signal detector 50, a limit thermostat 88 is connected in circuit with the area appliance 89. The limit thermostat turns on the appliance only when the temperature reaches a predetermined limit value.

Operation

In the operation of the system for conserving energy in a building, the minicomputer 22 includes a memory in which the usage and status of each room is continuously maintained. The program followed by the minicomputer periodically, such as once every minute, transfers from the computer memory to the shift register 30 binary information indicating whether or not energy can be conserved in each of the many rooms of the building. The shift register then controls the application of an audiofrequency tone burst of predetermined frequency and predetermined duration to the telephone lines leading to rooms in which energy can be conserved.

The signal detectors 50 in each room receiving a signal burst energizes a line relay 76, 84 which disconnects power from the cooler-heater appliance in the room for an interval such as 2 minutes, which is longer than the 1-minute interval between signal bursts. The appliance is maintained turned off until the room status changes and signal bursts are no longer sent along the telephone line to the room.

The energy conservation system is prevented from turning off the appliance if the temperature in the room is higher or lower than extreme limit values determined by thermostats 78 and 80. An alternative arrangement may be employed, particularly for a public area, in which the receipt of a signal burst causes a switching from a normal thermostat 87 to a limit thermostat 88.

The use of the described system results in an economic saving in the cost of electricity and/or gas which very quickly amounts to a sum equal to the cost of the energy conserving electronic apparatus.

What is claimed is:

1. Apparatus for turning off power-consuming appliances in rooms of a building having a private automatic branch exchange telephone system, comprising
    means at the exchange central periodically to apply a short burst of audio-frequency oscillations having a predetermined frequency and having a predetermined duration to telephone lines going to rooms in which power can be conserved,
    detecting means in each room connected to the room telephone line to provide an output on receipt of a burst having said predetermined frequency and duration,
    line relays in each room each having operating means and having contacts normally connecting power to the appliance in the room, and
    time-out devices in each room each responsive to an output from the detecting means in the room to operate the line relay in the room, disconnecting power from the appliance in the room for a predetermined time period greater than the time period between the application of bursts at the exchange central.

2. Apparatus as defined in claim 1 wherein said detecting means includes means to sense an off-hook condition of the room telephone and disable the detecting means from providing an output.

3. Apparatus as defined in claim 1 wherein said means to apply short bursts includes a register for storing manifestations of the desired conditions of appliances in each room, and gates enabled from outputs of said register to apply said bursts of audio-frequency oscillations to ones of said telephone lines determined by the contents of said register.

4. Apparatus utilizing a telephone line to turn off a power-consuming appliance in a room, comprising means at a central location under control of a computer to selectively and periodically apply a short burst of audio-frequency oscillations of predetermined frequency and predetermined duration to the telephone line to the room, detecting means in the room connected to the telephone line to provide an output on receipt of a burst having said predetermined frequency of oscillations and duration.

a line relay in the room having operating means and having contacts normally connecting power to the appliance, and a time-out device responsive to an output from said detecting means to operate said relay, disconnecting the power from the appliance, for a predetermined time period greater than the time period between the application of bursts at the central location.

* * * * *